(12) United States Patent
Veith et al.

(10) Patent No.: US 10,347,934 B2
(45) Date of Patent: Jul. 9, 2019

(54) SHEAR ACTIVATED IMPACT RESISTANT ELECTROLYTE

(71) Applicants: UT-Battelle, LLC, Oak Ridge, TN (US); Brian H. Shen, Walnut Creek, CA (US)

(72) Inventors: Gabriel M. Veith, Knoxville, TN (US); Beth L. Armstrong, Clinton, TN (US); Brian H. Shen, Walnut Creek, CA (US); Wyatt E. Tenhaeff, Pittsford, NY (US); Sergiy Kalnaus, Knoxville, TN (US); Hsin Wang, Knoxville, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 282 days.

(21) Appl. No.: 15/382,082

(22) Filed: Dec. 16, 2016

(65) Prior Publication Data
US 2017/0104236 A1 Apr. 13, 2017

Related U.S. Application Data

(63) Continuation of application No. 14/497,667, filed on Sep. 26, 2014, now Pat. No. 9,590,274.

(51) Int. Cl.
*H01M 10/054* (2010.01)
*H01M 10/05* (2010.01)
(Continued)

(52) U.S. Cl.
CPC ......... *H01M 10/054* (2013.01); *H01M 10/05* (2013.01); *H01M 10/0567* (2013.01);
(Continued)

(58) Field of Classification Search
CPC .. H01M 10/54; H01M 10/05; H01M 10/0567; H01M 10/568; H01M 10/0569;
(Continued)

(56) References Cited

U.S. PATENT DOCUMENTS 5,100,567 A 3/1992 Naae et al.
5,707,763 A 1/1998 Shimizu et al.
(Continued)

FOREIGN PATENT DOCUMENTS

JP 2010129244 A 6/2010
JP 2012195259 A 10/2012
(Continued)

OTHER PUBLICATIONS

Krzysztof Matyjaszewski, "Atom Transfer Radical Polymerization (ATRP): Current Status and Future Perspectives," 2012, pp. 4015-4039, vol. 45.
(Continued)

*Primary Examiner* — Helen Oi K Conley
(74) *Attorney, Agent, or Firm* — Fox Rothschild LLP

(57) ABSTRACT

A passively impact resistant composite electrolyte composition includes an electrolyte solvent, up to 6M of an electrolyte salt, and shear thickening ceramic particles having an outer surface. The shear thickening ceramic particles have an absolute zeta potential of greater than ±40 mV. The shear thickening ceramic particles have a polydispersity index of no greater than 0.1, and an average particle size of in a range of 50 nm to 1 um. The ceramic particles have bonded to the outer surface steric stabilizing polymers. The steric stabilizing polymers have a chain length of from 0.5 nm to 100 nm. A passively impact resistant laminated battery and a method of making the electrolyte composition are also disclosed.

49 Claims, 16 Drawing Sheets

(51) Int. Cl.

| | |
|---|---|
| *H01M 10/0567* | (2010.01) |
| *H01M 10/0568* | (2010.01) |
| *H01M 10/0569* | (2010.01) |
| *H01M 10/42* | (2006.01) |
| *H01M 12/08* | (2006.01) |
| H01M 10/052 | (2010.01) |

(52) U.S. Cl.
CPC ... *H01M 10/0568* (2013.01); *H01M 10/0569* (2013.01); *H01M 10/4235* (2013.01); *H01M 12/08* (2013.01); *H01M 10/052* (2013.01); *H01M 2300/0037* (2013.01); *H01M 2300/0085* (2013.01); *Y02E 60/128* (2013.01)

(58) Field of Classification Search
CPC . H01M 10/4235; H01M 12/08; H01M 10/052
See application file for complete search history.

(56) References Cited

U.S. PATENT DOCUMENTS

| | | |
|---|---|---|
| 6,476,317 B1 | 11/2002 | Frederickson et al. |
| 6,803,138 B2 | 10/2004 | Seabaugh et al. |
| 6,960,410 B2 | 11/2005 | Kim et al. |
| 7,235,335 B2 | 6/2007 | Kohno et al. |
| 7,261,833 B2 | 8/2007 | Seabaugh et al. |
| 7,498,276 B2 | 3/2009 | Wagner et al. |
| 7,504,181 B2 | 3/2009 | Kohno et al. |
| 7,594,181 B2 | 9/2009 | Rothwein et al. |
| 7,655,361 B2 | 2/2010 | Kim et al. |
| 7,659,036 B2 | 2/2010 | Kim et al. |
| 7,825,045 B1 | 11/2010 | Wagner et al. |
| 8,357,433 B2 | 1/2013 | Stevens et al. |
| 8,550,161 B2 | 10/2013 | Chen et al. |
| 8,956,688 B2 | 2/2015 | Li et al. |
| 9,590,274 B2 | 3/2017 | Veith et al. |
| 2004/0151985 A1 | 8/2004 | Munshi |
| 2006/0234572 A1 | 10/2006 | Wagner et al. |
| 2007/0015053 A1 | 1/2007 | Morris |
| 2007/0178374 A1 | 8/2007 | Aizenberg et al. |
| 2007/0218352 A1 | 9/2007 | Kohno et al. |
| 2007/0282053 A1 | 12/2007 | Wagner et al. |
| 2009/0004413 A1 | 1/2009 | Wagner et al. |
| 2009/0059474 A1 | 3/2009 | Zhamu et al. |
| 2009/0111002 A1 | 4/2009 | Lambrech et al. |
| 2012/0070746 A1 | 3/2012 | Mikhaylik et al. |
| 2012/0308872 A1 | 12/2012 | Huang |
| 2014/0211370 A1 | 7/2014 | Seymour et al. |
| 2014/0272532 A1 | 9/2014 | Park et al. |
| 2014/0363738 A1 | 12/2014 | Blanc et al. |
| 2015/0086875 A1 | 3/2015 | Yoshida |
| 2015/0099185 A1 | 4/2015 | Joo et al. |
| 2015/0155534 A1 | 6/2015 | Tsutsui et al. |
| 2015/0311567 A1 | 10/2015 | Todorof |
| 2015/0318555 A1 | 11/2015 | Oku et al. |
| 2015/0333311 A1 | 11/2015 | Kim et al. |
| 2015/0364263 A1 | 12/2015 | Petrzilek et al. |
| 2015/0372271 A1 | 12/2015 | Orilall et al. |
| 2015/0372350 A1 | 12/2015 | Solomon et al. |
| 2016/0013463 A1 | 1/2016 | Roumi et al. |
| 2016/0013515 A1 | 1/2016 | Lee et al. |
| 2016/0056437 A1 | 2/2016 | Huang et al. |
| 2017/0104236 A1 | 4/2017 | Veith et al. |

FOREIGN PATENT DOCUMENTS

| | | |
|---|---|---|
| WO | 2003022085 A2 | 3/2003 |
| WO | 2004103231 A1 | 12/2004 |
| WO | 2007146703 A2 | 12/2007 |
| WO | 2012081173 A1 | 6/2012 |

OTHER PUBLICATIONS

G.H. Bogush, et al., "Preparation of Monodisperse Silica Particles: Control of Size and Mass Fraction," Journal of—Crystalline Solids, 1988, pp. 95-106, vol. 104.

Ding et al.: "Smart Multifunctional Fluids for Lithium Ion Batteries: Enhanced Rate Performance and Intrinsic Mechanical Protection", Scientific Reports, 3:2485, Aug. 21, 2013.

Bergstroem: "Colloidal Processing of Ceramics", Handbook of Applied Surface and Colloid Chemistry, Chapter 9. 2001.

Fischer et al.: "Dynamic properties of sandwich structures with integrated shear-thickening fluids", Smart Mater. Struct. 15 (2006) 1467-1475.

Kandi et al.: "Effect of dispersant on the rheological properties of gelcast fused silica ceramics", IOP Conf. Series: Materials Science and Engineering 149 (2016) 012063.

Chou et al.: "Effect of Dispersants on the Rheological Properties and Slip Casting of Concentrated Alumina Slurry", J. Am. Ceram. SOC., 72 [9] 1622-27 (1989).

Brown et al.: "Generality of shear thickening in dense suspensions", Nature Materials, vol. 9, Mar. 2010.

Ye et al.: "nfluence of surfactants on shear-thickening behavior in concentrated polymer dispersions", J Nanopart Res, 115:2122, 2013.

Raghavan et al.: "Rheology of Silica Dispersions in Organic Liquids: New Evidence for Solvation Forces Dictated by Hydrogen Bonding", Langmuir 2000, 16, 7920-7930.

Dehmoune et al.: "Shear Thickening in Three Surfactants of the Alkyl Family CnTAB: Small Angle Neutron Scattering and Rheological Study", Langmuir 2009, 25(13), 7271-7278.

Barnes: "Shear-Thickening ("Dilatancy") in Suspensions of Nonaggregating Solid Particles Dispersed in Newtonian Liquids" Journal of Rheology 33, 329 (1989).

Gamez-Corrales et al.: "Shear-Thickening Dilute Surfactant Solutions: Equilibrium Structure as Studied by Small-Angle Neutron Scattering" Langmuir 1999, 15, 6755-6763.

Zhang et al.: "The rheology of shear thickening fluid (STF) and the dynamic performance of an STF-filled damper", Smart Mater. Struct. 17 (2008).

Babu, K et al.) Synthesis of polymer grafted magnetite nanoparticle with the highest grafting density via controlled radical polymerization. Nanoscale Research Letters. 2009. vol. 4. pp. 1090-1102.

Shivapooja, P et al.) ARGET—ATRP synthesis and characterization of pnipaam brushes for quantitative cell detachment studies. Biointerphases. 2012. vol. 7:32. pp. 1-9.

International Search Report mailed in PCT/IB17/57762 dated Mar. 9, 2018.

Krzysztof Matyjaszewski, "Atom Transfer Radical Polymerization (ATRP): Current Status and Future Perspectives," Macromolecules, 2012, pp. 4015-4039, vol. 45.

G.H. Bogush, et al., "Preparation of Monodisperse Silica Particles: Control of Size and Mass Fraction," Journal of Non-Crystalline Solids, 1988, pp. 95-106, vol. 104.

International Search Report dated Apr. 26, 2019 in PCT Application No. PCT/US18/64324.

SHEAR ACTIVATED IMPACT RESISTANT ELECTROLYTE

CROSS REFERENCE TO RELATED APPLICATIONS

This application is a continuation-in-part of U.S. patent application Ser. No. 14/497,667, filed Sep. 26, 2014 "Impact Resistant Electrolytes", the disclosure of which is hereby incorporated fully by reference.

STATEMENT REGARDING FEDERALLY SPONSORED RESEARCH

The United States Government has rights in this invention pursuant to contract no. DE-AC05-00OR22725 between the United States Department of Energy and UT-Battelle, LLC.

FIELD OF THE INVENTION

The present invention relates to electrolytes for energy storage devices such as batteries, and more particularly to impact resistant electrolytes having shear thickening ceramic particles.

BACKGROUND OF THE INVENTION

Advanced energy storage materials contain a significant amount of energy. Engineers design protective shrouds to prevent penetration of the battery compartments and the resulting electrical shorting. This electrical shorting spontaneously discharges the battery releasing all the energy at once causing a significant amount of local heating. When the heating is above the ignition temperature of the aprotic flammable organic electrolyte the electrolyte will catch on fire causing personnel or property damage. These fire events limit market penetration of advanced high energy batteries and limit energy storage applications. The remote chance of such an event must be eliminated to ensure consumer confidence and development of new devices/applications.

SUMMARY OF THE INVENTION

A passively impact resistant composite electrolyte composition includes an electrolyte solvent, up to 6M of an electrolyte salt, and shear thickening ceramic particles having an outer surface. The shear thickening ceramic particles have an absolute zeta potential of greater than ±40 mV. The ceramic particles have bonded to the outer surface steric stabilizing polymers. The steric stabilizing polymers have a chain length of from 0.5 nm to 100 nm. The shear thickening ceramic particles have a polydispersity index of no greater than 0.1, and an average particle size of in a range of 50 nm to 1 um.

The steric stabilizing polymers can have a chain length of greater than double the thickness of an electrochemical double layer surrounding the particles. The steric stabilizing polymers can have a chain length of no more than 60 nm. The steric stabilizing polymers have a chain length of no more than 40 nm. The steric stabilizing polymers can include from 1 to 145 monomer units. The passively impact resistant composite electrolyte composition can be stable to an operating voltage of 4.6V (versus Li/Li$^+$) in a cell.

The steric stabilizing polymers can be at least one selected from the group containing of hydrolytically stable, electrically insulating and ionically conducting. The steric stabilizing polymers can include monomer units selected from the group consisting of styrenes, acrylates, methacrylates, acrylonitrile, acrylamides, and methacrylamides, 4-vinylpyridine, 2,2'-dichloroethene, 2-methyl-1,3-butadiene acrylic acids and methacrylic acids, vinyl ester, N-vinyl carbazole, N-vinyl pyrrolidone and mixtures thereof. The steric stabilizing polymers comprise poly(methyl methacrylate) (PMMA).

The steric stabilizing polymers can be bonded to at least one selected from the group consisting of Si polymer, oxygen groups, surface hydroxyls, an Si—Ox groups of the ceramic particles. The passively impact resistant composite electrolyte composition can include at least one steric stabilizing polymer per square nanometer of the outer surface of the ceramic particles.

The shear thickening ceramic particles can include at least one material selected from the group consisting of $TiO_2$, $Al_2O_3$, $ZrO_2$, $Y_2O_3$, $HfO_2$, $GeO_2$, $Sc_2O_3$, $CeO_2$, $MgO$, $SiO_2$, $BN$, and $B_2O_3$. The shear thickening ceramic particles can include silica.

The shear thickening ceramic particles can have a polydispersity index of no greater than 0.09. The shear thickening ceramic particles can have a polydispersity index of no greater than 0.07. The shear thickening ceramic particles can have a polydispersity index of no greater than 0.05.

The shear thickening ceramic particles can have an average particle size of in a range of 100 nm to 500 nm. The shear thickening ceramic particles can have an average particle size of in a range of 150 nm to 300 nm.

The polymer chain can include a polyelectrolyte. The polyelectrolyte can be at least one selected from the group consisting of pectin, carrageenan, alginates, polyacrylic acid, poly(sodium styrene sulfonate) (PSS), polymethacrylic acid, poly vinyl amine, poly 2-vinylpyridine, carboxymethyl cellulose, poly(2-acrylamido-2-methyl-1-propanesulfonic acid), poly(2-acrylamido-2-methyl-1-propanesulfonic acid-co-acrylonitrile), poly(styrene sulfonic acid), poly(4-styrenesulfonic acid-co-maleic acid), and poly(vinylsulfonic acid).

The shear thickening ceramic particles can be essentially free of materials that volatilize at 80° C. The shear thickening ceramic particles can be essentially free of materials that volatilize at 110° C. The shear thickening ceramic particles can be essentially free of materials that volatilize at 120° C. The shear thickening ceramic particles can be present in the composition in an amount in the range of 10 to 50 weight percent.

The electrolyte solvent can include at least one material selected from the group consisting of ethylene carbonate, dimethyl carbonate, propylene carbonate, dimethoxyethane, dioxolane, sulfone, dinitriles, ethyl methyl carbonate, and an ionic liquid. The electrolyte salt can include at least one material selected from the group consisting of lithium hexafluorophosphate, lithium triflate, lithium perchlorate, lithium tetrafluoride borate, lithium hexafluoro lithium arsenate, lithium bis(trifluoromethane sulphone)imide, lithium bis(oxalate) borate, sodium perchlorate, sodium tetrafluoro borate, sodium hexafluoro arsenate, sodium bis (trifluoromethane sulphone)imide, sodium bis(oxalate) borate.

The shear thickening ceramic can be functionalized with at least one material selected from the group consisting of a styrene, an acrylate, a methacrylate, a vinyl ester, an acrylamide, a methacrylamide, an acrylonitrile, N-vinyl carbazole, and N-vinyl pyrrolidone.

A passively impact resistant battery includes an anode; a cathode, and a passively impact resistant composite electrolyte disposed between the anode and the cathode. The electrolyte includes a passively impact resistant composite electrolyte composition including an electrolyte solvent, up to 6M of an electrolyte salt, and shear thickening ceramic particles having an outer surface. The shear thickening ceramic particles have an absolute zeta potential of greater than ±40 mV. The shear thickening ceramic particles have a polydispersity index of no greater than 0.1, and an average particle size of in a range of 50 nm to 1 um. The shear thickening ceramic particles have bonded to the outer surface steric stabilizing polymers. The steric stabilizing polymers have a chain length of from 0.5 nm to 100 nm.

A method of making a passively impact resistant composite electrolyte composition can include the steps of:

a. Preparing shear thickening ceramic particles so that the shear thickening ceramic particles have passively a polydispersity index of no greater than 0.1, an average particle size of in a range of 50 nm to 1 μm, and an absolute zeta potential of greater than ±40 mV. The shear thickening ceramic particles have an outer surface, and the shear thickening ceramic particles have bonded to the outer surface steric stabilizing polymers. The steric stabilizing polymers have a chain length of from 0.5 nm to 100 nm.

b. Heat treating the shear thickening ceramic particles under negative pressure at a temperature of at least 80° C. to drive off volatile materials; and c. combining the heat treated shear thickening ceramic particles with an electrolyte solvent and up to 6 M of an electrolyte salt to make a composite electrolyte that comprises shear thickening ceramic particles in an amount in the range of 10 to 50 weight percent.

The method can include the step of, prior to polymerization of the steric stabilizing polymers on the surface of the shear thickening ceramic particles, treating the outer surface of the particles with halogen-terminated silane polymerization initiator. The polymerization initiator can be 3-trimethoxysilyl)propyl 2-bromo-2-methylpropionate. The polymerization process can be electron transfer (ARGET) atom transfer radical polymerization (ATRP).

The method of can include the step of providing silica as the ceramic particles. The silica particles can be derived from a Stober process. The silica particles can be derived from diatomaceous earth.

BRIEF DESCRIPTION OF THE DRAWINGS

There are shown in the drawings embodiments that are presently preferred it being understood that the invention is not limited to the arrangements and instrumentalities shown, wherein.

DETAILED DESCRIPTION OF THE INVENTION

Figure 1:
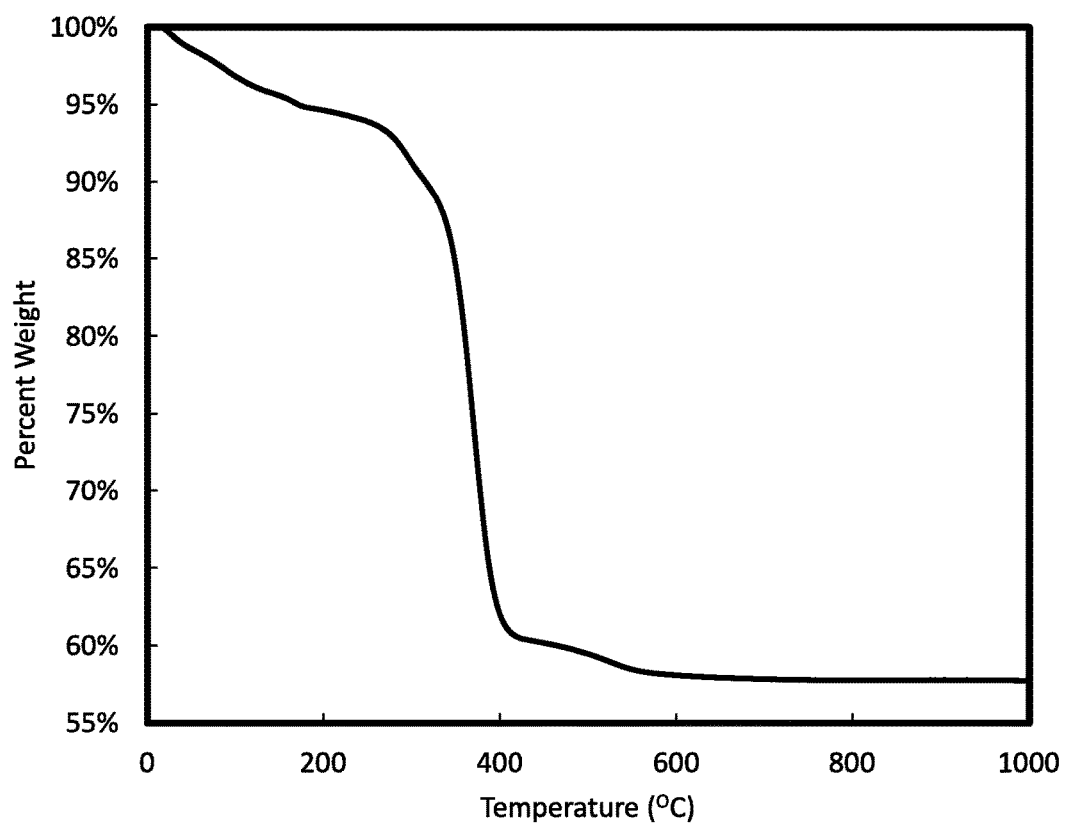
FIG. 1 is graph illustrating the TGA of PMMA treated silica, showing characteristic loss of water monolayer at 190° C., and additional severe loss at 340° C., indicating burn off of PMMA.

A passively impact resistant composite electrolyte composition according to the invention includes an electrolyte solvent, up to 6M of an electrolyte salt, and shear thickening ceramic particles. The shear thickening ceramic particles, without polymer bonded thereto, have an absolute zeta potential of greater than ±40 mV, a polydispersity index of no greater than 0.1, and an average particle size of in a range of 50 nm to 1 um. These ceramic particles have bonded to an outer surface steric stabilizing polymers. The steric stabilizing polymers have a chain length of from 0.5 nm to 100 nm.

The steric stabilizing polymers can have a chain length of greater than double the thickness of an electrochemical double layer surrounding the particles. The chain length can be no more than 100 nm, or no more than 60 nm. The chain length can be no more than 40 nm. The chain length can be 0.5, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, and 100 nm, or within a range of any high and low value among these.

The steric stabilizing polymers can be comprised from monomers and can include from 1 to 145 monomer units. The steric stabilizing polymers can be comprised of 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128, 129, 130, 131, 132, 133, 134, 135, 136, 137, 138, 139, 140, 141, 142, 143, 144, and 145 monomer units, or within a range of any high and low value among these.

The passively impact resistant composite electrolyte composition can be stable to an operating voltage of 4.6 V (versus Li/Li+) in a cell.

The steric stabilized polymers can be selected so as not be soluble in the aprotic solvents and to have an electrochemical stability window such that they are stable in contact with an anode such as graphite, silicon or lithium metal and they must be stable in contact with the cathode at a voltage >4.6V vs Li/Li$^+$. The steric stabilizing polymers are selected to have one or more suitable properties, and can be selected from polymers that are hydrolytically stable, electrically insulating and/or ionically conducting.

There are many possible steric stabilizing polymers. Suitable steric stabilizing polymers can be comprised of monomer units selected from the group consisting of styrenes, acrylates, methacrylates, acrylonitrile, acrylamides, and methacrylamides, 4-vinylpyridine, 2,2'-dichloroethene, 2-methyl-1,3-butadiene acrylic acids and methacrylic acids, vinyl ester, N-vinyl carbazole, N-vinyl pyrrolidone and mixtures thereof. Other monomer units are possible. An example of a steric stabilizing polymers is poly(methyl methacrylate) (PMMA).

The steric stabilizing polymers can also be a polyelectrolyte having an ionizable group. An ionically conductive polymer contributes to the ionic conductivity of the battery, possibly to the dispersability of the ceramic particles, and will possibly also improve the shear thickening behavior.

Many different polyelectrolyte polymers are possible. The polyelectrolyte polymer can be at least one selected from the group consisting of pectin, carrageenan, alginates, polyacrylic acid, poly(sodium styrene sulfonate) (PSS), polymethacrylic acid, poly vinyl amine, poly 2-vinylpyridine, carboxymethyl cellulose, poly(2-acrylamido-2-methyl-1-propanesulfonic acid), poly(2-acrylamido-2-methyl-1-propanesulfonic acid-co-acrylonitrile), poly(styrene sulfonic acid), poly(4-styrenesulfonic acid-co-maleic acid), and poly(vinylsulfonic acid).

The steric stabilizing polymers are bonded to the ceramic particles. The bond is a covalent bond. The bond can be terminal, at one end of the chain, with the other end untethered and free to move. The polymers can be bound to different sites on the ceramic polymer constituents. The polymers can be bonded to at least one selected from the group consisting of surface Si, oxygen groups, surface hydroxyls, and Si—Ox groups of the ceramic particles.

The steric stabilizing polymer is bound to all sides of the ceramic particles. The coverage of polymer binding sites per unit area of ceramic particle surface can vary. In one aspect there is at least one bound polymer per square nanometer of the outer surface of the ceramic particles with a maximum of 5 tethered molecules per 2 square nanometer. This value was selected to ensure some remaining surface hydroxyls remain on the surface of the ceramic which will impart some surface charge that will enable a concentration of lithium or sodium ions in close proximity to the ceramic surface thus ensuring suitable ion transport to and from the electrodes. In a typical ceramic oxide like $SiO_2$ there are approximately 4.6-4.9 surface hydroxyl groups per square nanometer of surface. Therefore, the number of bound polymers to surface sites has to be less than 5 per square nanometer, or 1, 1.5, 2, 2.5, 3, 3.5, 4, or 4.5 per square nanometer, or within a range of any high or low value among these. The invention can react only half of these groups, from 1.5 to 3.5 per square nanometer, to form covalent bonds and the resulting bound polymers. Additional coverage can result in the loss of surface charge.

The shear thickening ceramic particles can be comprised of any suitable ceramic material. In one aspect, the ceramic particles comprise at least one material selected from the group consisting of $TiO_2$, $Al_2O_3$, $ZrO_2$, $Y_2O_3$, $HfO_2$, $GeO_2$, $Sc_2O_3$, $CeO_2$, $MgO$, $SiO_2$, $BN$, and $B_2O_3$. The shear thickening ceramic particles can comprise silica.

The shear thickening ceramic particles can have a polydispersity index of no greater than 0.09. The shear thickening ceramic particles can have a polydispersity index of no greater than 0.05, 0.06, 0.07, 0.08, or 0.09, or within a range of any high and low value among these.

The shear thickening ceramic particles can have an average particle size, without the polymer bound thereto, of in a range of 50 nm to 1 μm, 100 nm to 500 nm, or 150 nm to 300 nm. The shear thickening ceramic particles can have an average size of 50, 60, 70, 80, 90, 100, 110, 120, 130, 140, 150, 160, 170, 180, 190, 200, 210, 220, 230, 240, 20, 260, 270, 280, 290, 300, 310, 320, 330, 340, 350, 360, 370, 380, 390, 400, 410, 420, 430, 440, 450, 460, 470, 480, 490, 500, 550, 600, 650, 700, 750, 800, 850, 900, 950, and 1000 nm, or within a range of any high and low value among these.

The shear thickening ceramic particles can be essentially free of materials that volatilize at 80° C. The shear thickening ceramic particles can be essentially free of materials that volatilize at 110° C. The shear thickening ceramic particles can be essentially free of materials that volatilize at 120° C.

The shear thickening ceramic particles with the steric stabilizing polymer can be present in the composition in an amount in the range of 10 to 50 weight percent, or 20 to 40 weight percent, based upon the total weight of the total weight of the ceramic/polymer particles and the electrolyte.

The electrolyte solvent can be any suitable electrolyte solvent. The electrolyte solvent can include at least one material selected from the group consisting of ethylene carbonate, dimethyl carbonate, propylene carbonate, dimethoxyethane, dioxolane, sulfone, dinitriles, ethyl methyl carbonate, and an ionic liquid. Examples of ionic liquids include, but are not limited to, for example, N-alkyl-N-methylpyrrolidinium bis(trifluoromethanesulfonyl)-imide, N-alkyl-N-methylpyrrolidinium bis(fluorosulfonyl)imide, and 1-ethyl-3-methyl-imidazolium bis(trifluoromethanesulfonyl)imide. A mixture of ethylene carbonate and dimethyl carbonate is often used as a solvent in preparing electrolytes, a commonly used mixture being 3:7 weight % ratio mixture of ethylene carbonate and dimethyl carbonate (for example, a mixture containing 30 grams ethylene carbonate and 70 grams dimethyl carbonate), referred to elsewhere herein as 3:7 EC/DMC. Other electrolyte solvents are possible. Conventional electrolyte additives may also be used; examples include, but are not limited to fluorinated ethylene carbonate, vinyl carbonate to promote solid electrolyte interface (SEI) formation on the anode or cathode with no substantial effect on shear thickening.

The electrolyte salt can be any suitable electrolyte salt. The electrolyte salt can include lithium hexafluorophosphate, lithium triflate, lithium perchlorate, lithium tetrafluoride borate, lithium hexafluoro lithium arsenate, lithium bis(trifluoromethane sulphone)imide, lithium bis(oxalate) borate, sodium perchlorate, sodium tetrafluoro borate, sodium hexafluoro arsenate, sodium bis(trifluoromethane sulphone)imide, sodium bis(oxalate) borate, and mixtures thereof. Other electrolyte salts are possible.

A passively impact resistant battery according to the invention can include an anode; a cathode, and a passively impact resistant composite electrolyte between the anode and the cathode. The electrolyte includes a passively impact resistant composite electrolyte composition comprising an electrolyte solvent, up to 6M of an electrolyte salt, and shear thickening ceramic particles having an outer surface. The shear thickening ceramic particles have an absolute zeta potential of greater than ±40 mV. The ceramic particles have bonded to the outer surface steric stabilizing polymers. The steric stabilizing polymers have a chain length of from 0.5 nm to 100 nm. The shear thickening ceramic particles having a polydispersity index of no greater than 0.1, an average particle size of in a range of 50 nm to 1 um.

A method of making a passively impact resistant composite electrolyte composition includes the step of preparing shear thickening ceramic particles so that the shear thickening ceramic particles have a polydispersity index of no greater than 0.1, an average particle size of in a range of 50 nm to 1 μm, and an absolute zeta potential of greater than ±40 mV, without polymer bonded thereto. The shear thickening ceramic particles have bonded to an outer surface steric stabilizing polymers. The steric stabilizing polymers having a chain length of from 0.5 nm to 100 nm.

The shear thickening ceramic particles are heat treated under negative pressure at a temperature of at least 80° C. to drive off volatile materials. The heat treated shear thickening ceramic particles are combined with an electrolyte solvent and up to 6 M of an electrolyte salt to make a composite electrolyte that comprises shear thickening ceramic particles in an amount in the range of 10 to 50 weight percent.

The method can include the step of, prior to polymerization of the steric stabilizing polymers on the surface of the shear thickening ceramic particles, treating the outer surface of the particles with halogen-terminated silane polymerization initiator. The polymerization initiator can be any suitable initiator, for example 3-trimethoxysilyl)propyl 2-bromo-2-methylpropionate. The polymerization process comprises electron transfer (ARGET) atom transfer radical polymerization (ATRP), or any suitable polymerization process.

The silica particles are derived from a Stober process. The silica particles can be derived from diatomaceous earth. The particles can be spherical in shape, but do not have to be spherical so long as the polydispersity is acceptable.

A passively impact resistant composite electrolyte composition includes an electrolyte solvent, up to 6M of an electrolyte salt, and shear thickening ceramic particles having a polydispersity index of no greater than 0.1, an average particle size of in a range of 50 nm to 1 μm, and a method to stabilize the particles against flocculation. The stabilization process includes sterically stabilizing the particles with a chemically bound polymer coating, or a chemically bound charged polyelectrolyte.

The passively impact resistant composite electrolyte composition of the invention undergoes a passive shear thickening phenomenon upon application of an external force, introducing a significant passive resistance against mechanical damage. Integration of a passive shear thickening effect and enhanced transport of a specific silica material into a liquid electrolyte provides greatly improved stability and safety. For example, a laminated battery cell can include the passively impact resistant composite electrolyte sandwiched between an anode and a cathode.

The passive shear thickening effect is not needed until the occurrence of an impact or intrusion upon a battery cell, which is generally caused by an external force. Passive shear thickening enables the material to form a solid barrier which prevents the cathode from touching the anode electrode, thus circumventing a potentially catastrophic electrical short. Since the effect is passive, there is generally no need for expensive electronic monitoring and no need to over-engineer a battery cell. Moreover, the liquid-like nature of the electrolyte enhances its compatibility with conventional battery cell manufacturing technology. The invention is applicable to sundry battery cell types, including, for example, those that employ lithium ion, sodium ion, and/or metal-air electrolyte systems.

The key component of the passively impact resistant composite electrolyte composition is a particulate shear thickening ceramic material. Examples of ceramic materials that will undergo shear thickening include, but are not limited to $TiO_2$, $Al_2O_3$, $ZrO_2$, $Y_2O_3$, $HfO_2$, $GeO_2$, $Sc_2O_3$, $CeO_2$, $MgO$, $SiO_2$, and combinations of any of the foregoing. Other ceramics include insulating nitrides and sulfides like BN, $Li_3N$, and $Li_2S$.

It was discovered unexpectedly that specific particulate forms of ceramic materials have certain, identifiable, reproducible characteristics that produce the degree of shear thickening that is needed for battery safety technology, while also being suitable for adequate electrolyte functionality. The polymers that are suitable for steric stabilization of ceramic particles must have an electrochemical stability window such that they are stable in contact with an anode such as graphite, silicon or lithium metal and they should also be stable in contact with the cathode at a voltage >4.6V vs $Li/Li^+$. The polymers should be mostly linear with any branching confined to the end of the polymer, more than half of the chain length, away from the ceramic surface. Branching near the ceramic surface will prevent a high enough concentration of polymers to bind to the surface sites to be useful. This is estimated at about 1 polymer per square nanometer of ceramic surface. Any crosslinking between bound polymers should be confined to no more than 3 polymer backbones to ensure the polymer is dangling off the ceramic surface and free to interact with other polymers bound to adjacent ceramic particles. The polymer should be bound to the ceramic surface, not simply coating the surface. This is a significant distinction since many polymers in battery applications coat particles with a surface layer over the particle, as opposed to forming a covalent bond with the ceramic surface, and particularly a terminal bond. Candidate polymers include but are not limited to oligoethers like poly (ethylene oxide) (PEO), poly (methyl methacrylate) (PMMA), poly(acrylonitrile) (PAN), poly(vinylidene fluoride) (PVDF), poly (vinyl chlorides)(PVC), polypropylene (PP), polyethylene(PE), poly(vinylidene fluoride-co-hexafluoropropylene) (PVDF-HFP) and polystyrenes (PS). In general these polymers contain C—C backbones with pendent groups resulting in a large separation between the highest and lowest occupied orbitals (HOMO/LUMO). Candidate materials have pendant groups with high electronegativities like O, N, F, Cl. Unstable polymers include polysiloxanes which decompose at chemical potentials seen in batteries.

The steric stabilizing polymers prevent the ceramic particles from touching each other so they don't flocculate. Chains grown on the silica particles described above can be grown to lengths greater than 0.5 nm should be no longer than 100 nm in length, preferably no greater than 60 nm, most preferably no greater than 40 nm. Beyond 100 nm in length reduces the concentration of ceramic particles in solution below 40 wt % and causes a decrease in the shear thickening response and the material becomes oily.

An example steric stabilizing polymer would be poly (methyl methacrylate) (PMMA) chains via a process called activators regenerated by electron transfer (ARGET) atom transfer radical polymerization (ATRP). This process allows polymer chains to be grown on the surface of the particles continuously to any desired length until stopped, usually done by exposing the polymerization media to air. Prior to polymerization, the silica nanoparticle surface is treated with a halogen-terminated silane polymerization initiator like (3-trimethoxysilyl)propyl 2-bromo-2-methylpropionate upon which the chains are grown.

The density of the polymer chains covering the silica nanoparticle surface is limited by the number of active sites available to the silane polymerization initiator to tether, which specifically targets and bonds to $Si-O_x$ groups. Assuming a silane molecule will occupy one square nanometer, each 200 nm diameter silica nanoparticle should ultimately be covered by $1.26 \times 10^5$ PMMA chains. The specific ARGET ATRP procedure we used to functionalize the silica particles has a polymer growth rate for PMMA of approximately 10 nm/hour at room temperature. The diameter of the methyl methacrylate monomer group, and PMMA brush thickness, is estimated to be 0.696 nm based on the equation below. Polymer grown on the silica particles described above can be grown to lengths greater than 0.5 nm (one polymer monomer unit) should be no longer than 100 nm in length (about 145 monomer units), preferably no greater than 60 nm (about 85 monomer units), most preferably no greater than 40 nm (about 58 monomer units).

$$Volume_{monomer} = \frac{Monomer\ Molar\ Mass}{Monomer\ Density \times N_A}$$

These PMMA polymers are hydrolytically stable, electrically insulating, and when plasticized with a salt ionically conducting, all of which are important in maintaining high capacity and stability in lithium ion batteries. This is due in large part to the carbonyl structure present in the methyl methacrylate monomer. Thus, similar monomers such as acrylic acid, methacrylic acid, or methoxy polyethylene glycol methacrylate (MPEGMA) can be used for surface treatments and will exhibit these desired behaviors. Other monomers include styrenes, acrylates, methacrylates, acrylonitrile, acrylamides, and methacrylamides, 4-vinylpyridine, 2,2'-dichloroethene, 2-methyl-1,3-butadiene acrylic acids and methacrylic acids. And mixtures thereof.

The length of the polymer chains or polymer groups need to be greater than double the thickness of the electrochemical double layer on the ceramic particles. Specifically, the separation distance between the ceramic particles needs to be greater than twice the polymer chain layer thickness. The dielectric properties of the particles and solvent will affect the electrochemical double layer thickness on the surface of the ceramic particles and thus will affect the length of the polymer brush or monomers on the surface.

The electrolyte composition, prepared by generally conventional methods, is an essentially homogeneous mixture comprising the stabilized particles and up to 6M of a selected salt in a selected solvent. The stabilized particles loading must be in an amount in the range of 10-50 wt. %, preferably 20-40 wt. %. The salt content must be in the range of 0.5 to 6M, more preferably in the range of 0.8 to 2 M.

Electrodes described herein can be used with various conventional electrode systems. Anode materials can include, for example, graphite, Li, Si, Sn, $Cu_2Sb$, $Mo_3Sb_7$, Sb, $Cu_6Sn_5$, Al, Pt, Au, In, and the like. Cathode materials can include, for example, Li, Si, Sn, $Cu_2Sb$, $Mo_3Sb_7$, Sb, $Cu_6Sn_5$, Al, Pt, Au, In, and the like. Cathode materials can include, for example, $LiNi_{1/3}Mn_{1/3}Co_{1/3}O_2$(NMC), $LiCoO_2$, $Li(CoAl)_1O_2$, $Li_{1.2}(MnNiCo)_{0.8}O_2$(AKA Lithium rich), $LiMn_2O_4$, $Li_2MnO_3$, $LiMn_{1.5}Ni_{0.5}O_4$, $LiFePO_4$, $LiCoPO_4$, $LiNiPO_4$, $LiNiO_2$, Li—V—O, $Li_2Si$—Mn, Fe, Ni—$O_4$, $NaFeO_2$, $NaCrO_2$, Na(Fe,Mn,Ni,Co)$O_2$, $Na_2$(Ni,Fe,Mn)$O_4$, and the like.

The invention can be utilized in many convention energy storage devices or devices employing energy storage subsystems. Example include electrochemical devices, sensors displays, windows, and photochromic optical armor.

General parameters were employed in preparing testing various embodiments described in the examples, which follow herein below.

Samples of various forms of commercially available silica were washed with ethanol and dried under vacuum at temperatures between ambient (about 21° C.) and 120° C. 10-50 wt % silica were dispersed in 3:7 EC/DMC containing between 0 and 1.2M $LiPF_6$. Mixtures were sonicated using a standard laboratory ultrasonic wand to ensure homogenous distributions. The ceramic silicas had a Zeta potential greater than 40 mV, particle diameters of 200 nm±40 nm with a polydispersity of 0.06±0.04 based on light scattering.

Stöber derived silica sample batches were prepared using the procedure described hereinabove. The silica particles were grown at 0° C. After preparation the Silica was washed with ethanol and dried under vacuum at temperatures between ambient (about 21° C.) and 130° C. The resulting silica powders were dispersed in 3:7 EC/DMC containing between 0 and 1.2M $LiPF_6$ to have 10-50 wt % silica.

Electrochemical test cells were constructed using a standard $LiNi_{1/3}Mn_{1/3}Co_{1/3}O_2$ (NMC) cathode, and either a graphite (Gr) or lithium metal (Li) anode. Separators made of various materials, including glass fiber, polyacrylonitrile; polypropylene, or a mixture of polypropylene and polyethylene were disposed between the anodes and cathodes. To prepare a cell the electrolyte was added drop-wise to the separator which was placed between the cathode and anode electrodes. Cells tested were standard.

EXAMPLES

Example 1

This example focuses on the steric stabilization of spherical particles. The Stöber derived silica prepared as described was dried at 120° C. for 3 hours. Poly(methyl methacrylate) (PMMA) polymer chains were grown via activators regenerated by electron transfer (ARGET) atom transfer radical polymerization (ATRP) on the silica surface. Prior to polymerization, the silica nanoparticle surface was treated with a halogen-terminated silane polymerization initiator like (3-trimethoxysilyl)propyl 2-bromo-2-methylpropionate upon which the chains are grown. The specific ARGET ATRP procedure that was used to functionalize the silica particles has a polymer growth rate for PMMA of approximately 10 nm/hour at room temperature. The polymer chains were grown for 6 hours with a length of 60 nm total.

Figure 2:
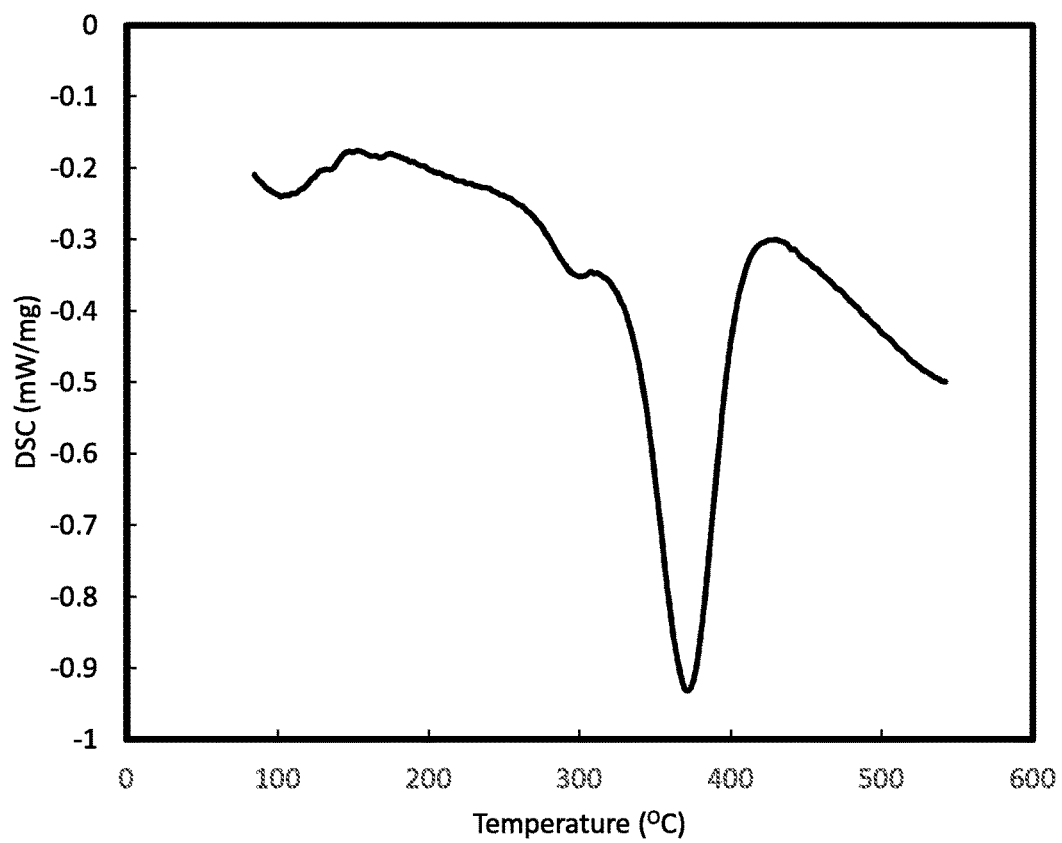
FIG. 2 is a graph illustrating the DSC of PMMA treated silica, confirming strong exotherm at 340° C.

FIG. 1 shows TGA data collected for the PMMA coated silica. The data show the loss of water at 190° C. followed by PMMA decomposition at 340° C. FIG. 2 shows DSC data for the PMMA coated silica. The endotherm at 340° C. confirms the decomposition of PMMA chains in the TGA data (FIG. 1). From the weight loss and BET surface area one can estimate the PMMA brush loading and the thickness described above.

Figure 3:
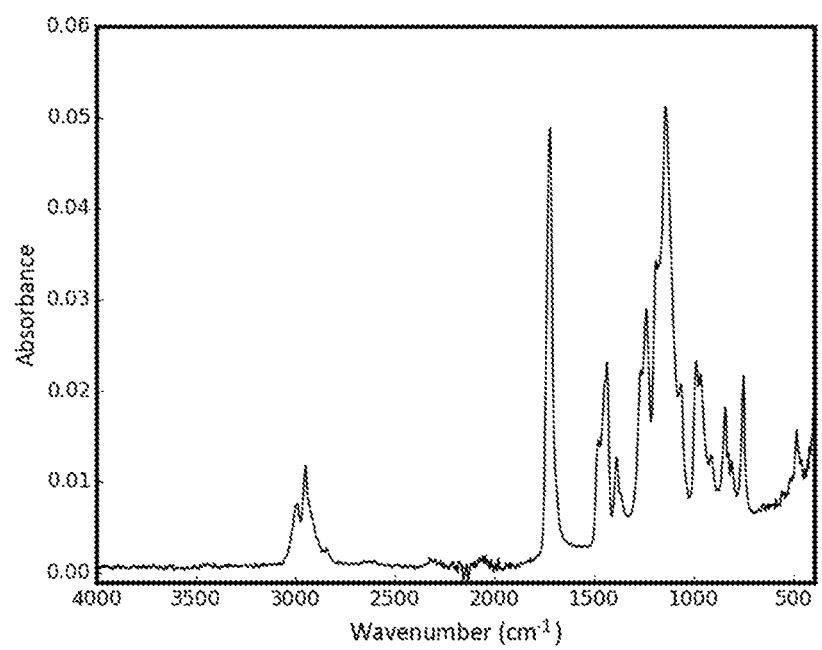
FIG. 3 is a graph illustrating the ATR-FTIR spectrum of poly(methyl methacrylate) standard.
Figure 4:
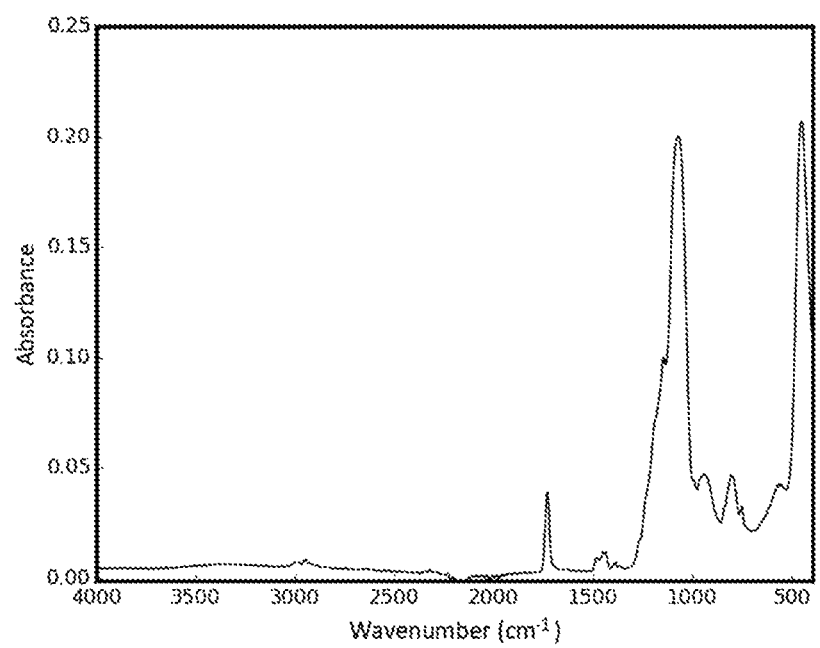
FIG. 4 is a graph illustrating the ATR-FTIR spectrum of silica particles vacuum dried at room temperature and subsequently functionalized with poly(methyl methacrylate) chains.

To confirm the growth of PMMA on the $SiO_2$ the samples were subjected to ATR-FTIR measurements. FIG. 3 shows a reference spectra for PMMA. FIG. 4 shows ATR-FTIR spectra of the silica particles functionalized with PMMA as evident by the characteristic vibrational bands centered around 3000, 1800 and 1400 $cm^{-1}$ for PMMA along with the vibrational bands for $SiO_2$ centered around 1100, 900, 800, and 450 $cm^{-1}$.

Drying conditions are important to prepare the best electrode possible for the PMMA samples. It is clear from the TGA data (FIG. 1) that there is a significant loss of mass below 50° C. due to weakly adsorbed water.

Example 2

Figure 5:
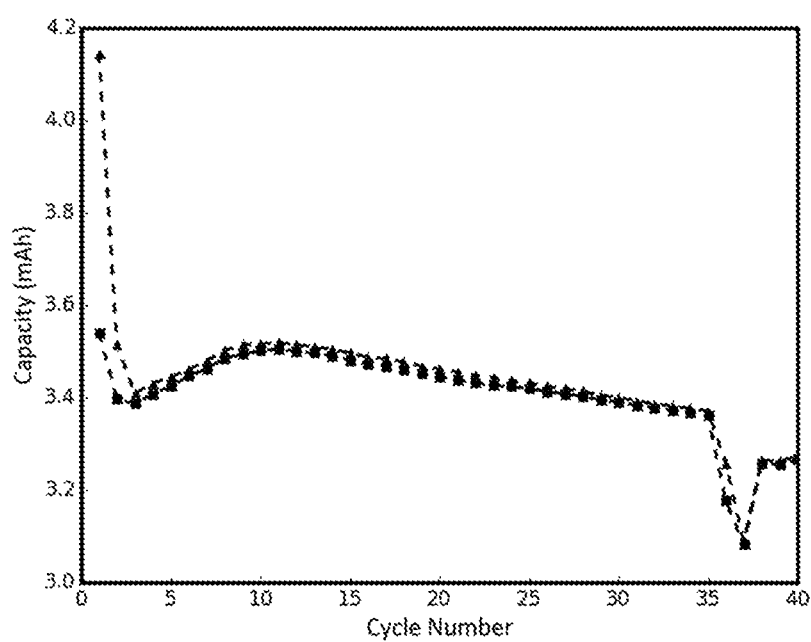
FIG. 5 is a graph illustrating the charge capacity (triangles) and discharge capacity (squares) over cycle number with PMMA functionalized $SiO_2$ Dreamweaver Gold 40 separator heat treated at 80° C.
Figure 6:
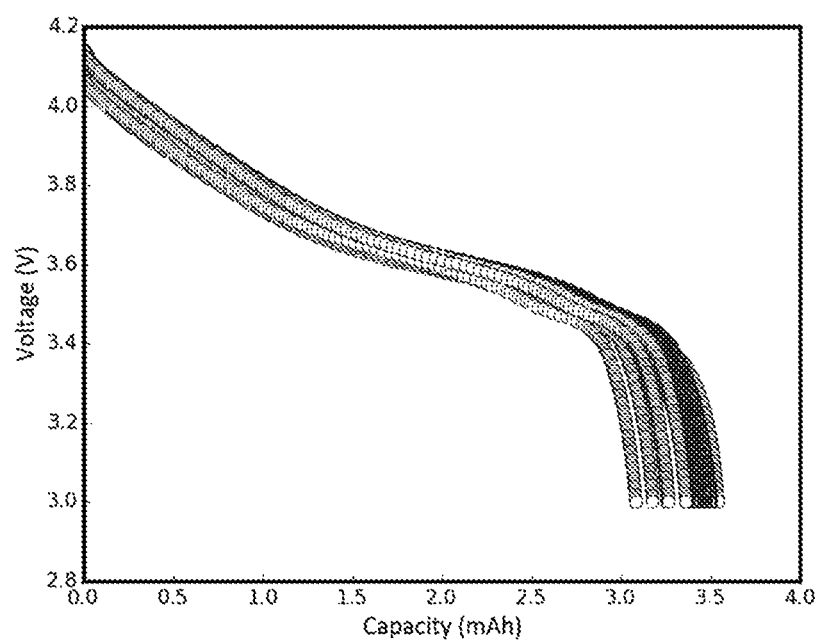
FIG. 6 is a graph illustrating the discharge profile for battery with functionalized $SiO_2$ on Dreamweaver Gold 40 separator heat treated at 80° C.

The resulting particles were evaluated for performance as an electrolyte. The PMMA coated $SiO_2$ was drop cast onto a separator (DreamWeaver Brand Gold 40) to ensure the dispersion of the particles. The PMMA loaded separator was dried at 80° C. under vacuum for an estimated weight loading of 5.0 $mg/cm^2$. The dried PMMA-$SiO_2$ loaded separator was placed in an electrochemical test cell constructed using a standard $LiNi_{1/3}Mn_{1/3}Co_{1/3}O_2$ (NMC) cathode and a graphite (Gr) anode. 110 microliters of 3:7 EC/DMC solvent containing 1.2M $LiPF_6$ purchased from BASF were added to the cell resulting in a 20 wt % solution of shear thickening material. FIG. 5 shows capacity as a function of cycle for these electrochemical cells indicating good cycle retention. FIG. 6 shows the voltage profile for these electrochemical cells indicating a stable voltage profile which is essential for battery applications.

Example 3

Figure 7:
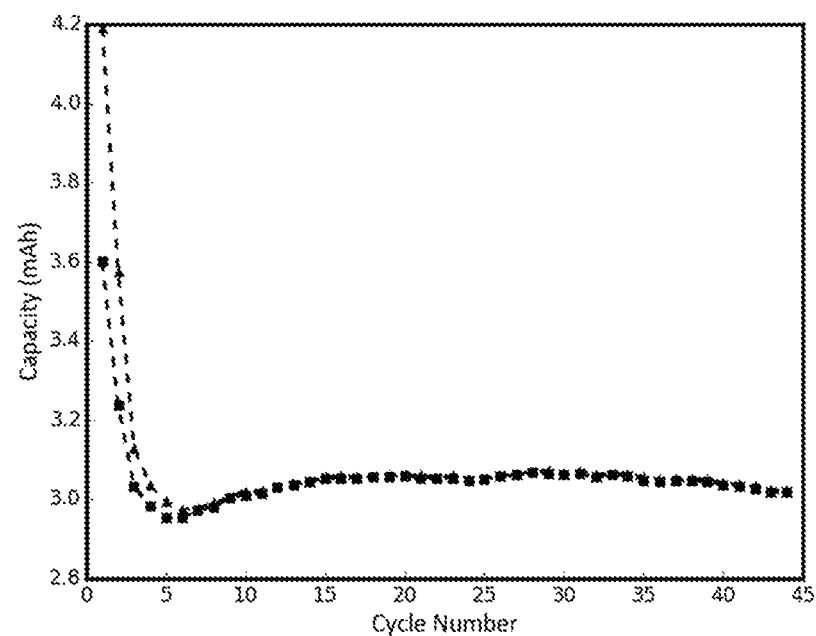
FIG. 7 is a graph illustrating the charge capacity (triangles) and discharge capacity (squares) over cycle number with PMMA functionalized $SiO_2$ Dreamweaver Gold 40 separator heat treated at 80° C.
Figure 8:
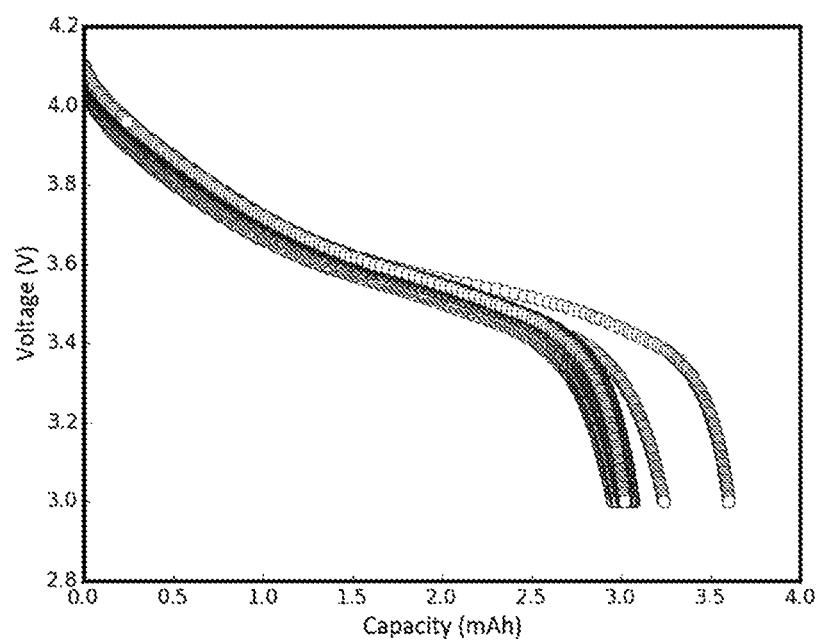
FIG. 8 is a graph illustrating the discharge profile for battery with PMMA functionalized $SiO_2$ on Dreamweaver Gold 40 separator heat treated at 80° C.

The resulting particles were evaluated for performance as an electrolyte. The PMMA coated $SiO_2$ was drop cast onto a separator (DreamWeaver Brand Gold 40) to ensure the dispersion of the particles. The PMMA loaded separator was dried at 80° C. under vacuum for an estimated weight loading of 5.1 $mg/cm^2$. The dried PMMA-$SiO_2$ loaded separator was placed in an electrochemical test cell constructed using a standard $LiNi_{1/3}Mn_{1/3}Co_{1/3}O_2$ (NMC) cathode and a graphite (Gr) anode. 110 microliters of 3:7 EC/DMC solvent containing 1.2M $LiPF_6$ purchased from BASF were added to the cell resulting in a 20 wt % solution of shear thickening material. FIG. 7 shows capacity as a function of cycle for these electrochemical cells indicating good cycle retention. FIG. 8 shows the voltage profile for these electrochemical cells indicating a stable voltage profile which is essential for battery applications.

Example 4

Figure 9:
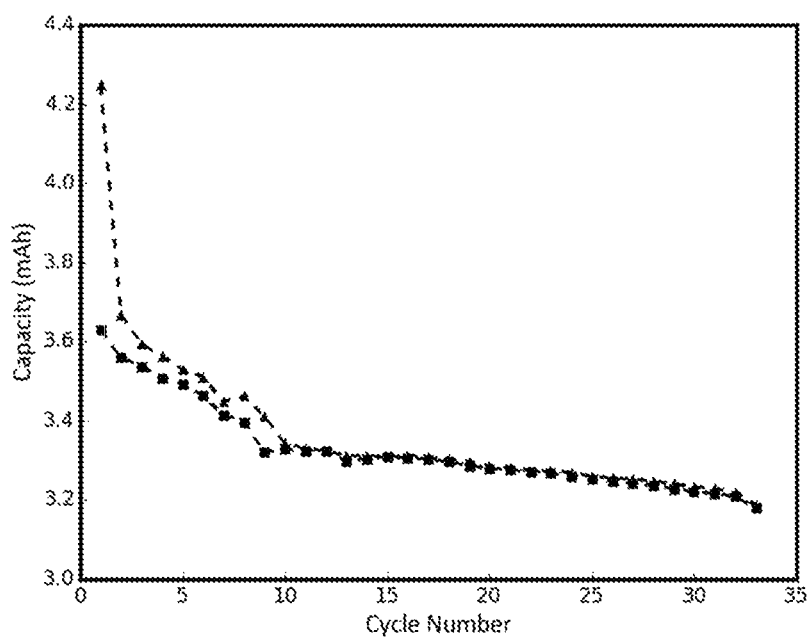
FIG. 9 is a graph illustrating the charge capacity (triangles) and discharge capacity (squares) over cycle number with PMMA functionalized $SiO_2$ Dreamweaver Gold 40 separator with heat treated at 110° C.
Figure 10:
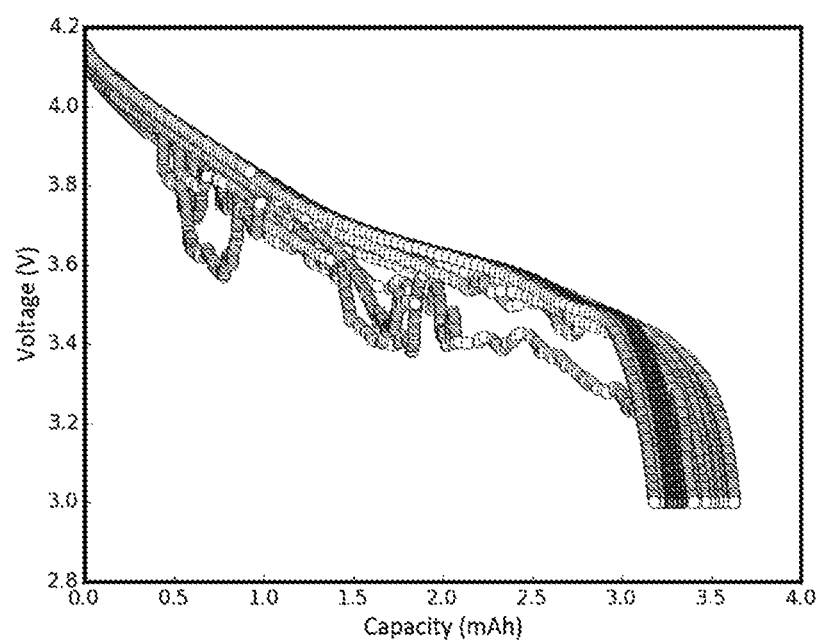
FIG. 10 is a graph illustrating the discharge profile for battery with PMMA functionalized $SiO_2$ on Dreamweaver Gold 40 separator with heat treated at 110° C.

The resulting particles were evaluated for performance as an electrolyte. The PMMA coated $SiO_2$ was drop cast onto a separator (DreamWeaver Brand Gold 40) to ensure the dispersion of the particles. The PMMA loaded separator was dried at 110° C. under vacuum for an estimated weight loading of 4.9 $mg/cm^2$. The dried PMMA-$SiO_2$ loaded separator was placed in an electrochemical test cell constructed using a standard $LiNi_{1/3}Mn_{1/3}Co_{1/3}O_2$ (NMC) cathode and a graphite (Gr) anode. 110 microliters of 3:7 EC/DMC solvent containing 1.2M $LiPF_6$ purchased from BASF were added to the cell resulting in a 20 wt % solution of shear thickening material. FIG. 9 shows capacity as a function of cycle for these electrochemical cells indicating good cycle retention. However, FIG. 10 shows the voltage profile for these electrochemical cells indicating an unstable voltage profile indicating the heating protocol damages the PMMA resulting in electrical shorts or passivation of the electrode from polymer components. Therefore, drying should be limited in temperature and duration.

Example 5

Figure 11:
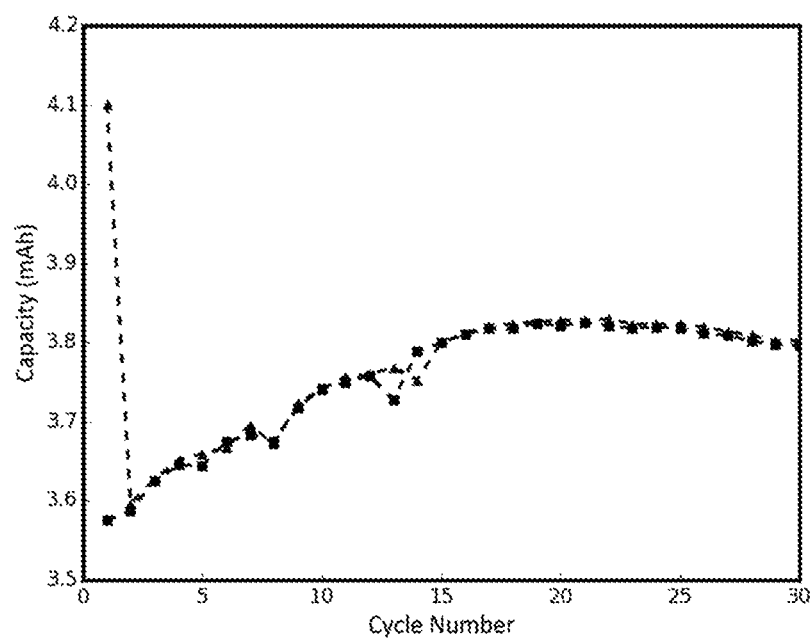
FIG. 11 is a graph illustrating the charge capacity (triangles) and discharge capacity (squares) over cycle number with PMMA functionalized $SiO_2$ Dreamweaver Gold 40 separator heat treated at 110° C.
Figure 12:
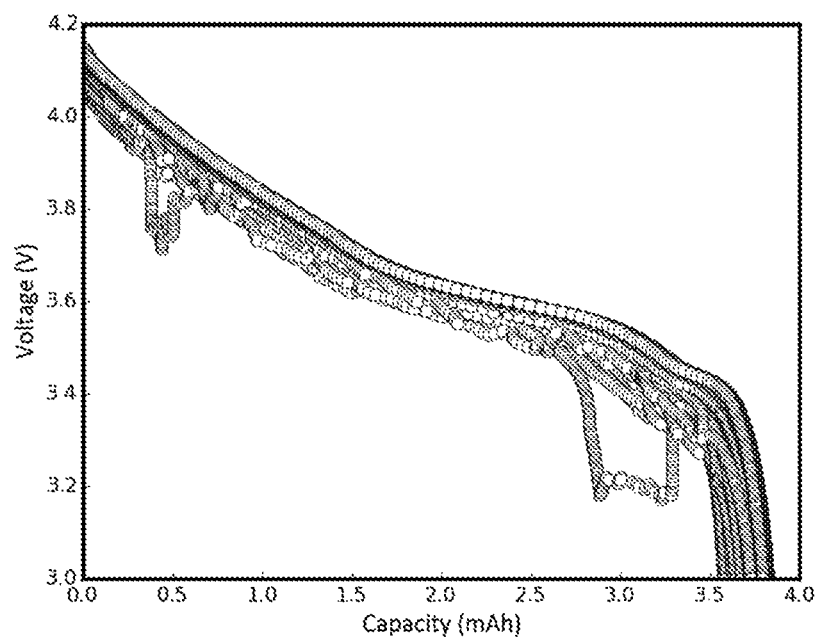
FIG. 12 is a graph illustrating the discharge profile for battery with PMMA functionalized $SiO_2$ on Dreamweaver Gold 40 separator heat treated at 110° C.

The resulting particles were evaluated for performance as an electrolyte. The PMMA coated $SiO_2$ was drop cast onto a separator (DreamWeaver Brand Gold 40) to ensure the dispersion of the particles. The PMMA loaded separator was dried at 110° C. under vacuum for an estimated weight loading of 5.0 $mg/cm^2$. The dried PMMA-$SiO_2$ loaded separator was placed in an electrochemical test cell constructed using a standard $LiNi_{1/3}Mn_{1/3}Co_{1/3}O_2$ (NMC) cathode and a graphite (Gr) anode. 110 microliters of 3:7 EC/DMC solvent containing 1.2M $LiPF_6$ purchased from BASF were added to the cell resulting in a 20 wt % solution of shear thickening material. FIG. 11 shows capacity as a function of cycle for these electrochemical cells indicating good cycle retention. However, FIG. 12 shows the voltage profile for these electrochemical cells indicating an unstable voltage profile indicating the heating protocol damages the PMMA resulting in electrical shorts or passivation of the electrode from polymer components. Therefore drying should be limited in temperature and duration.

Example 6

The Stöber derived silica prepared as described was dried at 120° C. for 3 hours. Poly(methyl methacrylate) (PMMA) polymer chains were grown via activators regenerated by electron transfer (ARGET) atom transfer radical polymerization (ATRP) on the silica surface. Prior to polymerization, the silica nanoparticle surface was treated with a halogen-terminated silane polymerization initiator like (3-trimethoxysilyl)propyl 2-bromo-2-methylpropionate upon which the polymer chains are grown. The specific ARGET ATRP procedure that was used to functionalize the silica particles has a polymer growth rate for PMMA of approximately 10 nm/hour at room temperature. The polymer chains were grown for 4 hours with a length of 40 nm total.

Figure 13:
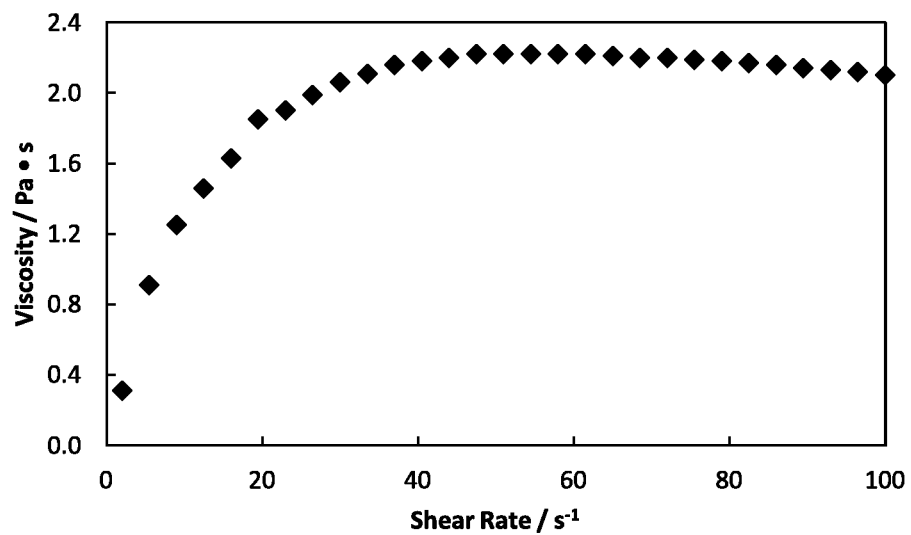
FIG. 13 is a graph illustrating the shear thickening response of 30 wt % PMMA treated $SiO_2$ nanoparticles in propylene carbonate.

A 30 wt % solution of the ceramic particles coated with the 40 nm PMMA chains was dispersed in propylene carbonate. The sample exhibited shear thickening based on rheological measurements (FIG. 13) indicating the desired rheological response for a battery application.

Example 7

The Stöber derived silica prepared as described was dried at 120° C. for 3 hours. Poly(methyl methacrylate) (PMMA) polymer chains were grown via activators regenerated by electron transfer (ARGET) atom transfer radical polymerization (ATRP) on the silica surface. Prior to polymerization, the silica nanoparticle surface was treated with a halogen-terminated silane polymerization initiator like (3-trimethoxysilyl)propyl 2-bromo-2-methylpropionate upon which the chains are grown. The specific ARGET ATRP procedure that was used to functionalize the silica particles has a polymer growth rate for PMMA of approximately 10 nm/hour at room temperature. The polymer chains were grown for 4 hours with a length of 40 nm total.

Figure 14:
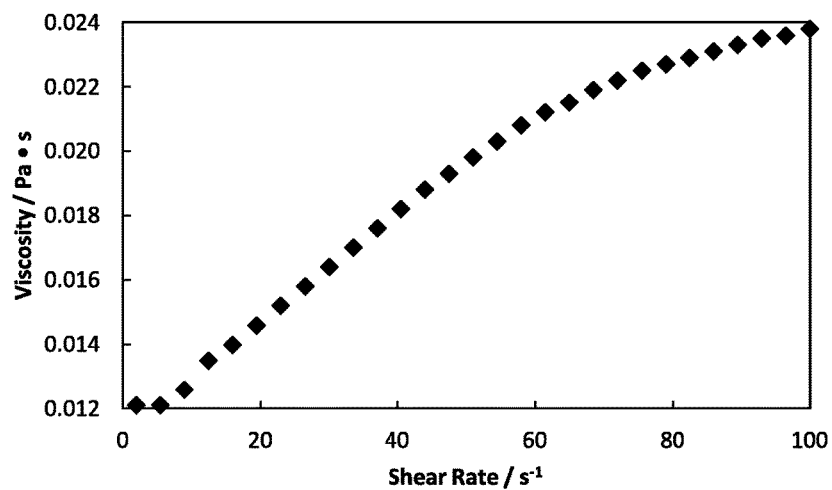
FIG. 14 is a graph illustrating the shear thickening response of 15 wt % PMMA treated $SiO_2$ particles in propylene carbonate.

A 15 wt % solution of the 40 nm PMMA chains was dispersed in propylene carbonate. The sample exhibited shear thickening based on rheological measurements (FIG. 14) indicating the desired rheological response for a battery application.

Example 8

The Stöber derived silica prepared as described was dried at 120° C. for 3 hours. Poly(methyl methacrylate) (PMMA) polymer chains were grown via activators regenerated by electron transfer (ARGET) atom transfer radical polymerization (ATRP) on the silica surface. Prior to polymerization, the silica nanoparticle surface was treated with a halogen-terminated silane polymerization initiator like (3-trimethoxysilyl)propyl 2-bromo-2-methylpropionate upon which the chains are grown. The specific ARGET ATRP procedure that was used to functionalize the silica particles has a polymer growth rate for PMMA of approximately 10 nm/hour at room temperature. The polymer chains were grown for 4 hours with a length of 40 nm total. Based on TGA data this corresponds to 1.5 surface hydroxyls reacted on the silica during the polymer growth.

Figure 15:
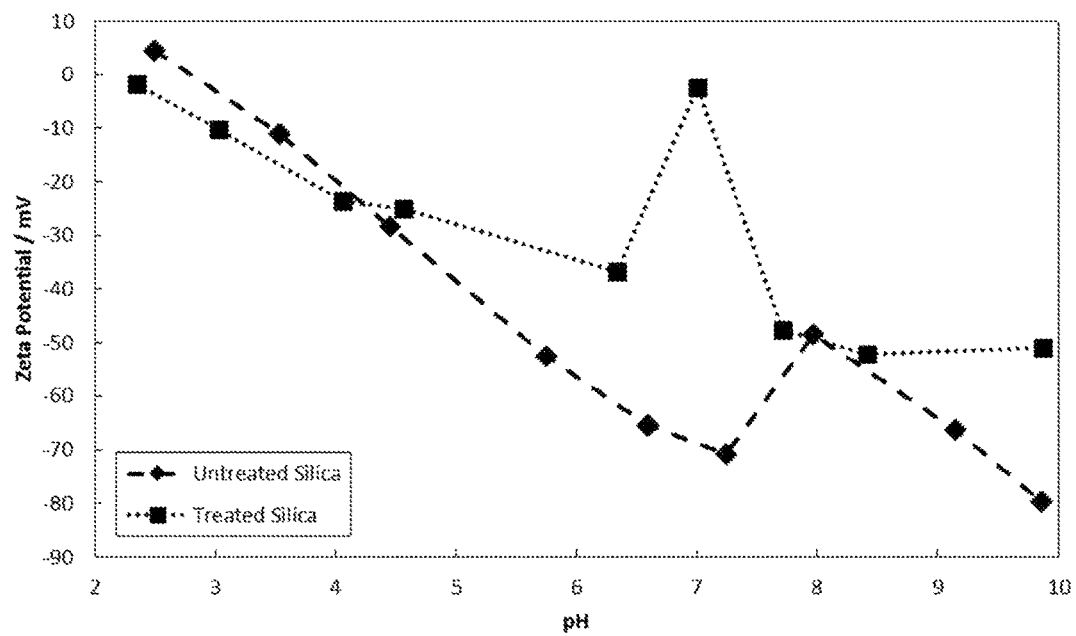
FIG. 15 is a graph of the zeta potential versus pH for particles with 40 nm polymer chains with 1.5 OH groups reacted per square nanometer, based on TGA analysis.

The coated and uncoated ceramic particle were subjected to zeta potential measurements (FIG. 15). This data shows the resulting particles still contain a large zeta potential consistent with a charged silica surface. There was still a substantial surface charge on the ceramic particles bound with PMMA polymers.

Example 9

The Stöber derived silica prepared as described was dried at 120° C. for 3 hours. Poly(methyl methacrylate) (PMMA) polymer chains were grown via activators regenerated by electron transfer (ARGET) atom transfer radical polymerization (ATRP) on the silica surface. Prior to polymerization, the silica nanoparticle surface was treated with a halogen-terminated silane polymerization initiator like (3-trimethoxysilyl)propyl 2-bromo-2-methylpropionate upon which the chains are grown. The specific ARGET ATRP procedure that was used to functionalize the silica particles has a polymer growth rate for PMMA of approximately 10 nm/hour at room temperature. The polymer was grown for 4 hours with a length of 40 nm total. Based on TGA data this corresponds to 1.5 surface hydroxyls reacted on the silica during the polymer growth.

Figure 16:
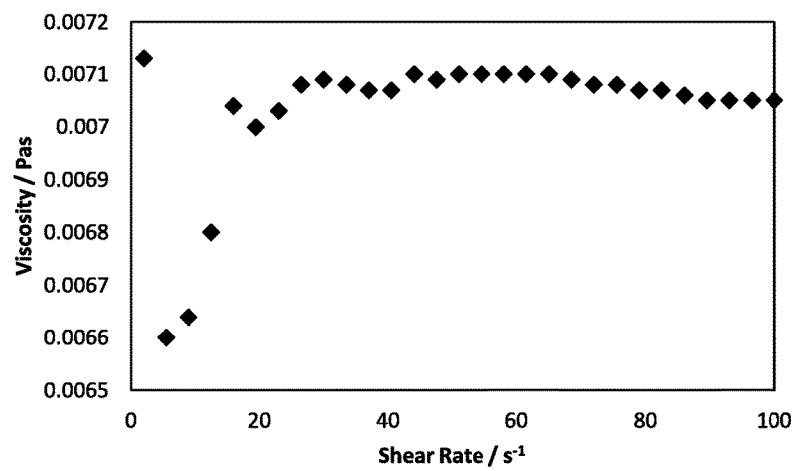
FIG. 16 is a plot of viscosity/Pa·s vs shear rate/$s^{-1}$ for 10 wt % PMMA (40 nm) coated $SiO_2$ particles dispersed in propylene carbonate.

A 10 wt % solution of the ceramic particles with the 40 nm PMMA chains was dispersed in propylene carbonate. The sample exhibited Newtonian behavior based on rheological measurements (FIG. 16) indicating a non-desired rheological response for a battery application.

Figure 17:
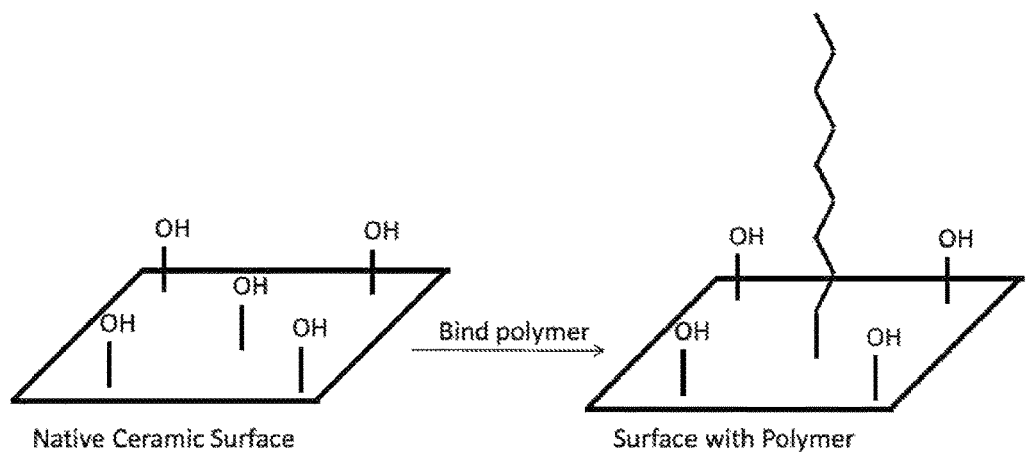
FIG. 17 is a schematic diagram illustrating poly chains grown on a silica surface.
Figure 18:
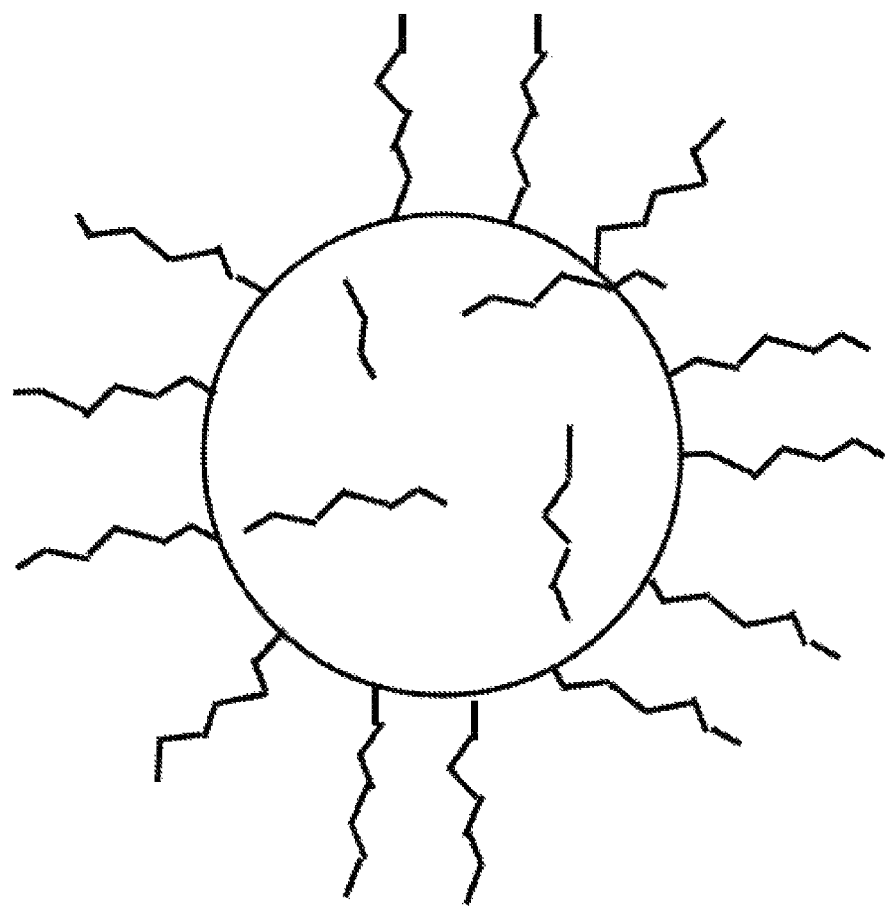
FIG. 18 is a schematic diagram of silica particles having bonded thereto polymer chains according to the invention.

The invention is depicted schematically in FIGS. 17-18. FIG. 17 is a schematic diagram illustrating poly chains grown on a silica surface. FIG. 18 is a schematic diagram of silica particles having bonded thereto polymer chains according to the invention.

This invention can be embodied in other forms without departing from the spirit or essential attributes thereof, and accordingly reference should be made to the following claims to determine the scope of the invention.

We claim:

1. A passively impact resistant composite electrolyte composition comprising an electrolyte solvent, up to 6M of an electrolyte salt, and shear thickening ceramic particles having an outer surface, the shear thickening ceramic particles having an absolute zeta potential of greater than ±40 mV, a polydispersity index of no greater than 0.1, and an average particle size in a range of 50 nm to 1 um, the ceramic particles having bonded to the outer surface steric stabilizing polymers, the steric stabilizing polymers having a chain length of from 0.5 nm to 100 nm.

2. The passively impact resistant composite electrolyte composition of claim 1, wherein the steric stabilizing polymers having a chain length of greater than double the thickness of an electrochemical double layer surrounding the particles.

3. The passively impact resistant composite electrolyte composition of claim 1, wherein the steric stabilizing polymers have a chain length of no more than 60 nm.

4. The passively impact resistant composite electrolyte composition of claim 1, wherein the steric stabilizing polymers have a chain length of no more than 40 nm.

5. The passively impact resistant composite electrolyte composition of claim 1, wherein the steric stabilizing polymers comprise from 1 to 145 monomer units.

6. The passively impact resistant composite electrolyte composition of claim 1, wherein the composition is stable to an operating voltage of 4.6V (versus Li/Li$^+$) in a cell.

7. The passively impact resistant composite electrolyte composition of claim 1, wherein the steric stabilizing polymers are at least one selected from the group containing of hydrolytically stable, electrically insulating and ionically conducting.

8. The passively impact resistant composite electrolyte composition of claim 1, wherein the steric stabilizing polymers comprise monomer units selected from the group consisting of styrenes, acrylates, methacrylates, acrylonitrile, acrylamides, and methacrylamides, 4-vinylpyridine, 2,2'-dichloroethene, 2-methyl-1,3-butadiene acrylic acids and methacrylic acids, vinyl ester, N-vinyl carbazole, N-vinyl pyrrolidone and mixtures thereof.

9. The passively impact resistant composite electrolyte composition of claim 1, wherein the steric stabilizing polymers comprise poly(methyl methacrylate) (PMMA).

10. The passively impact resistant composite electrolyte composition of claim 1, wherein the steric stabilizing polymers are bonded to at least one selected from the group consisting of Si polymer, oxygen groups, surface hydroxyls, an Si—Ox groups of the ceramic particles.

11. The passively impact resistant composite electrolyte composition of claim 1, comprising at least one steric stabilizing polymer per square nanometer of the outer surface of the ceramic particles.

12. The passively impact resistant composite electrolyte composition of claim 1, wherein the shear thickening ceramic particles comprise at least one material selected from the group consisting of $TiO_2$, $Al_2O_3$, $ZrO_2$, $Y_2O_3$, $HfO_2$, $GeO_2$, $Sc_2O_3$, $CeO_2$, $MgO$, $SiO_2$, $BN$, and $B_2O_3$.

13. The passively impact resistant composite electrolyte composition of claim 1, wherein said shear thickening ceramic particles comprise silica.

14. The passively impact resistant composite electrolyte composition of claim 1, wherein the shear thickening ceramic particles have a polydispersity index of no greater than 0.09.

15. The passively impact resistant composite electrolyte composition in accordance with claim 1, wherein said shear thickening ceramic particles have a polydispersity index of no greater than 0.07.

16. The passively impact resistant composite electrolyte composition of claim 1, wherein the shear thickening ceramic particles have a polydispersity index of no greater than 0.05.

17. The passively impact resistant composite electrolyte composition of claim 1, wherein the shear thickening ceramic particles have an average particle size of in a range of 100 nm to 500 nm.

18. The passively impact resistant composite electrolyte composition of claim 1, wherein the shear thickening ceramic particles have an average particle size of in a range of 150 nm to 300 nm.

19. The passively impact resistant composite electrolyte composition of claim 1, wherein the polymer is a polyelectrolyte.

20. The passively impact resistant composite electrolyte composition of claim 19, wherein the polyelectrolyte is at least one selected from the group consisting of pectin, carrageenan, alginates, polyacrylic acid, poly(sodium styrene sulfonate) (PSS), polymethacrylic acid, poly vinyl amine, poly 2-vinylpyridine, carboxymethyl cellulose, poly (2-acrylamido-2-methyl-1-propanesulfonic acid), poly(2-acrylamido-2-methyl-1-propanesulfonic acid-co-acrylonitrile), poly(styrene sulfonic acid), poly(4-styrenesulfonic acid-co-maleic acid), and poly(vinylsulfonic acid).

21. The passively impact resistant composite electrolyte composition of claim 1, wherein the shear thickening ceramic particles are essentially free of materials that volatilize at 80° C.

22. The passively impact resistant composite electrolyte composition of claim 1, wherein the shear thickening ceramic particles are essentially free of materials that volatilize at 110° C.

23. The passively impact resistant composite electrolyte composition of claim 1, wherein the shear thickening ceramic particles are essentially free of materials that volatilize at 120° C.

24. The passively impact resistant composite electrolyte composition of claim 1, wherein the shear thickening ceramic particles are present in the composition in an amount in the range of 10 to 50 weight percent.

25. The passively impact resistant composite electrolyte composition of claim 1, wherein the electrolyte solvent comprises at least one material selected from the group consisting of ethylene carbonate, dimethyl carbonate, propylene carbonate, dimethoxyethane, dioxolane, sulfone, dinitriles, ethyl methyl carbonate, and an ionic liquid.

26. The passively impact resistant composite electrolyte composition of claim 1, wherein the electrolyte salt comprises at least one material selected from the group consisting of lithium hexafluorophosphate, lithium triflate, lithium perchlorate, lithium tetrafluoride borate, lithium hexafluoro lithium arsenate, lithium bis(trifluoromethane sulphone)imide, lithium bis(oxalate) borate, sodium perchlorate, sodium tetrafluoro borate, sodium hexafluoro arsenate, sodium bis (trifluoromethane sulphone)imide, sodium bis(oxalate) borate.

27. The passively impact resistant composite electrolyte composition of claim 1, wherein the shear thickening ceramic is functionalized with at least one material selected from the group consisting of a styrene, an acrylate, a methacrylate, a vinyl ester, an acrylamide, a methacrylamide, an acrylonitrile, N-vinyl carbazole, and N-vinyl pyrrolidone.

28. A passively impact resistant battery comprising: an anode; a cathode; and a passively impact resistant composite electrolyte disposed between said anode and said cathode, the electrolyte comprising a passively impact resistant composite electrolyte composition comprising an electrolyte solvent, up to 6M of an electrolyte salt, and shear thickening ceramic particles having an outer surface, the shear thickening ceramic particles having an absolute zeta potential of greater than ±40 mV, a polydispersity index of no greater than 0.1, and an average particle size in a range of 50 nm to 1 um, the ceramic particles having bonded to the outer surface steric stabilizing polymers, the steric stabilizing polymers having a chain length of from 0.5 nm to 100 nm.

29. The passively impact resistant battery of claim 28, wherein the steric stabilizing polymers having a chain length greater than double the thickness of an electrochemical double layer surrounding the particles.

30. The passively impact resistant battery of claim 28, wherein the steric stabilizing polymers have a chain length of no more than 60 nm.

31. The passively impact resistant battery of claim 29, wherein the steric stabilizing polymers have a chain length of no more than 40 nm.

32. The passively impact resistant battery of claim 29, wherein the steric stabilizing polymers comprise from 1 to 145 monomer units.

33. The passively impact resistant battery of claim 28, wherein the composition is stable to an operating voltage of 4.6 V (versus $Li/Li^+$) in a cell.

34. The passively impact resistant battery of claim 28, wherein the steric stabilizing polymers are hydrolytically stable, electrically insulating and ionically conducting.

35. The passively impact resistant battery of claim 28, wherein the steric stabilizing polymers comprise monomer units selected from the group consisting of styrenes, acrylates, methacrylates, acrylonitrile, acrylamides, and methacrylamides, 4-vinylpyridine, 2,2'-dichloroethene, 2-methyl-1,3-butadiene acrylic acids and methacrylic acids, vinyl ester, N-vinyl carbazole, N-vinyl pyrrolidone and mixtures thereof.

36. The passively impact resistant battery of claim 28, wherein the steric stabilizing polymers comprise poly(methyl methacrylate) (PMMA).

37. The passively impact resistant battery of claim 28, wherein the steric stabilizing polymers are bonded to at least one selected from the group consisting of Si polymer, oxygen groups, surface hydroxyls, an Si—Ox groups of the ceramic particles.

38. The passively impact resistant battery of claim 28, comprising at least one steric stabilizing polymer per square nanometer of the outer surface of the ceramic particles.

39. The passively impact resistant battery of claim 28, wherein the shear thickening ceramic particles comprise at least one material selected from the group consisting of $TiO_2$, $Al_2O_3$, $ZrO_2$, $Y_2O_3$, $HfO_2$, $GeO_2$, $Sc_2O_3$, $CeO_2$, MgO, $SiO_2$, BN and $B_2O_3$.

40. The passively impact resistant battery of claim 28, wherein the shear thickening ceramic particles comprise silica.

41. A method of making a passively impact resistant composite electrolyte composition comprising the steps of:

a. Preparing shear thickening ceramic particles so that said shear thickening ceramic particles have passively a polydispersity index of no greater than 0.1, an average particle size of in a range of 50 nm to 1 μm, and an absolute zeta potential of greater than ±40 mV, the shear thickening ceramic particles having an outer surface, the shear thickening ceramic particles having bonded to the outer surface steric stabilizing polymers, the steric stabilizing polymers having a chain length of from 0.5 nm to 100 nm;

b. Heat treating said shear thickening ceramic particles under negative pressure at a temperature of at least 80° C. to drive off volatile materials; and c. combining said heat treated shear thickening ceramic particles with an electrolyte solvent and up to 6 M of an electrolyte salt to make a composite electrolyte that comprises shear thickening ceramic particles in an amount in the range of 20 to 40 weight percent.

42. The method of making a passively impact resistant composite electrolyte composition of claim 41, wherein prior to polymerization of the steric stabilizing polymers on the surface of the shear thickening ceramic particles, treating the outer surface of the particles with halogen-terminated silane polymerization initiator.

43. The method of making a passively impact resistant composite electrolyte composition of claim 41, wherein the polymerization initiator is 3-trimethoxysilyl)propyl 2-bromo-2-methylpropionate.

44. The method of making a passively impact resistant composite electrolyte composition of claim 41, wherein the polymerization process comprises electron transfer (ARGET) atom transfer radical polymerization (ATRP).

45. The method of making a passively impact resistant composite electrolyte composition of claim 41 wherein said shear thickening ceramic particles comprise at least one material selected from the group consisting of $TiO_2$, $Al_2O_3$, $ZrO_2$, $Y_2O_3$, $HfO_2$, $GeO_2$, $Sc_2O_3$, $CeO_2$, $MgO$, $SiO_2$, $BN$ and $B_2O_3$.

46. The method of making a passively impact resistant composite electrolyte composition of claim 42, wherein the shear thickening ceramic particles comprise silica.

47. The method of making a passively impact resistant composite electrolyte composition of claim 46, wherein the silica particles are derived from a Stober process.

48. The method of making a passively impact resistant composite electrolyte composition of claim 46, wherein the silica particles are derived from diatomaceous earth.

49. The method of making a passively impact resistant composite electrolyte composition of claim 41, wherein the steric stabilizing polymers have a chain length of greater than double the thickness of an electrochemical double layer surrounding the particles.

* * * * *